(12) United States Patent
Turski et al.

(10) Patent No.: US 8,200,408 B2
(45) Date of Patent: Jun. 12, 2012

(54) SYSTEM AND METHOD FOR ACTIVE TRACTION CONTROL OF A VEHICLE

(75) Inventors: Michael P. Turski, Rochester Hills, MI (US); Charles M. Tomlinson, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 552 days.

(21) Appl. No.: 12/340,823

(22) Filed: Dec. 22, 2008

(65) Prior Publication Data

US 2010/0161194 A1    Jun. 24, 2010

(51) Int. Cl.
*B60K 28/16* (2006.01)
*B62D 6/08* (2006.01)
*G06F 19/00* (2006.01)

(52) U.S. Cl. .............. 701/87; 701/80; 701/84; 180/197; 303/159

(58) Field of Classification Search .............. 701/87, 701/72, 80, 82, 84, 67, 90, 91; 180/197; 303/159

See application file for complete search history.

(56) References Cited

U.S. PATENT DOCUMENTS

| | | | |
|---|---|---|---|
| 4,796,739 A | 1/1989 | Jonner et al. | |
| 5,219,212 A | 6/1993 | Shimada et al. | |
| 5,225,982 A | 7/1993 | Ito et al. | |
| 5,243,526 A | 9/1993 | Ito et al. | |
| 5,245,542 A | 9/1993 | Itoh et al. | |
| 5,262,952 A | 11/1993 | Tsuyama et al. | |
| 5,278,761 A * | 1/1994 | Ander et al. | 701/84 |
| 5,518,307 A * | 5/1996 | Okazaki | 303/159 |
| 6,324,461 B1 | 11/2001 | Yamaguchi et al. | |
| 6,347,680 B1 * | 2/2002 | Mianzo et al. | 180/197 |
| 6,456,924 B1 | 9/2002 | Schmitt et al. | |
| 6,757,603 B2 * | 6/2004 | Nozaki | 701/51 |
| 7,219,497 B2 | 5/2007 | Kowatari et al. | |
| 7,324,884 B2 * | 1/2008 | Sporl et al. | 701/54 |
| 7,349,785 B2 | 3/2008 | Lee et al. | |
| 7,747,363 B1 * | 6/2010 | Tang | 701/22 |
| 7,753,156 B2 | 7/2010 | Nishiike et al. | |
| 7,765,050 B2 | 7/2010 | Hrovat et al. | |
| 7,853,389 B2 | 12/2010 | Luehrsen et al. | |

(Continued)

FOREIGN PATENT DOCUMENTS

DE  19855332 A1  6/2000

(Continued)

OTHER PUBLICATIONS

German Office Action, dated Jun. 20, 2011, for German Patent Application No. 10 2009 058 531.1.

*Primary Examiner* — Tan Q Nguyen
(74) *Attorney, Agent, or Firm* — Ingrassia Fisher & Lorenz, P.C.

(57) ABSTRACT

A method for active traction control of a vehicle can be performed to optimize corner exiting performance of a vehicle that is operating in a high performance or racing environment. The method estimates a real-time tire traction value during operation of the vehicle, computes a remaining tire traction value based upon a comparison of the estimated real-time tire traction value to a total available tire traction value, and calculates a traction system torque limit from the remaining tire traction value. The calculated torque limit can then be used to limit the actual traction system torque of the vehicle as needed in a real-time manner.

19 Claims, 3 Drawing Sheets

U.S. PATENT DOCUMENTS

| | | |
|---|---|---|
| 2003/0200016 A1* | 10/2003 | Spillane et al. ................. 701/36 |
| 2005/0064990 A1 | 3/2005 | Berger |
| 2006/0157315 A1 | 7/2006 | Kraxner |
| 2006/0219454 A1 | 10/2006 | Itoh et al. |
| 2007/0193802 A1 | 8/2007 | Hu |
| 2008/0105479 A1 | 5/2008 | Nishiike et al. |
| 2008/0183353 A1 | 7/2008 | Post et al. |
| 2008/0287253 A1 | 11/2008 | Gibson et al. |
| 2009/0012682 A1 | 1/2009 | Mathis |
| 2010/0049408 A1 | 2/2010 | Abadie et al. |

FOREIGN PATENT DOCUMENTS

| | | |
|---|---|---|
| DE | 19933084 A1 | 1/2001 |
| DE | 10050420 A1 | 3/2003 |
| DE | 10164766 A1 | 5/2003 |
| EP | 1197409 A2 | 4/2002 |
| WO | 2008065032 A1 | 6/2008 |

* cited by examiner

SYSTEM AND METHOD FOR ACTIVE TRACTION CONTROL OF A VEHICLE

TECHNICAL FIELD

Embodiments of the subject matter described herein relate generally to traction control systems for vehicles. More particularly, embodiments of the subject matter relate to an active traction control system suitable for use during high performance driving.

BACKGROUND

Vehicle traction control systems are well known, and such systems have been deployed in many production vehicles. Traction control systems are sometimes referred to as electronic stability control (ESC) systems or dynamic stability control (DSC) systems. A traction control system is an active system that monitors the traction (wheel slip) of the vehicle and automatically takes corrective action when excessive wheel slip is detected. The corrective action is intended to stabilize the vehicle, reduce the wheel slip, and keep the vehicle on a safe and predictable path. Conventional traction control systems usually rely on a combination of engine torque control (via throttle adjustment, spark advance, cylinder cutout, etc.) and brake control to quickly and automatically stabilize the vehicle.

BRIEF SUMMARY

A method for active traction control of a vehicle is provided. The method involves estimating a real-time tire traction value during operation of the vehicle, computing a remaining tire traction value based upon a comparison of the estimated real-time tire traction value to a total available tire traction value, calculating a traction system torque limit from the remaining tire traction value, and limiting actual traction system torque of the vehicle using the traction system torque limit.

A method for active control of corner exiting of a vehicle is also provided. This method involves the steps of receiving a user-selected driving condition setting that is indicative of road conditions, calculating a traction system torque limit that is influenced by the user-selected driving condition setting, and limiting actual traction system torque of the vehicle using the traction system torque limit.

An onboard vehicle-based system for active traction control of a vehicle is also provided. The system includes a user interface subsystem configured to receive a user-selected driving condition setting that is indicative of current road conditions, a vehicle sensor subsystem configured to collect real-time vehicle status data during operation of the vehicle, a traction system configured to generate torque for the drive wheels of the vehicle, and a controller coupled to the user interface subsystem, to the vehicle sensor subsystem, and to the traction system. The controller is configured to receive the real-time vehicle status data from the vehicle sensor subsystem and, in response thereto, to estimate a real-time tire traction value for the vehicle. The controller also receives the user-selected driving condition setting from the user interface subsystem and, in response thereto, generates a total available tire traction value. The controller is further configured to compute a remaining tire traction value based upon a difference between the total available tire traction value and the estimated real-time tire traction value, calculate a traction system torque limit from the remaining tire traction value, and limit torque output of the traction system using the traction system torque limit.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 2:
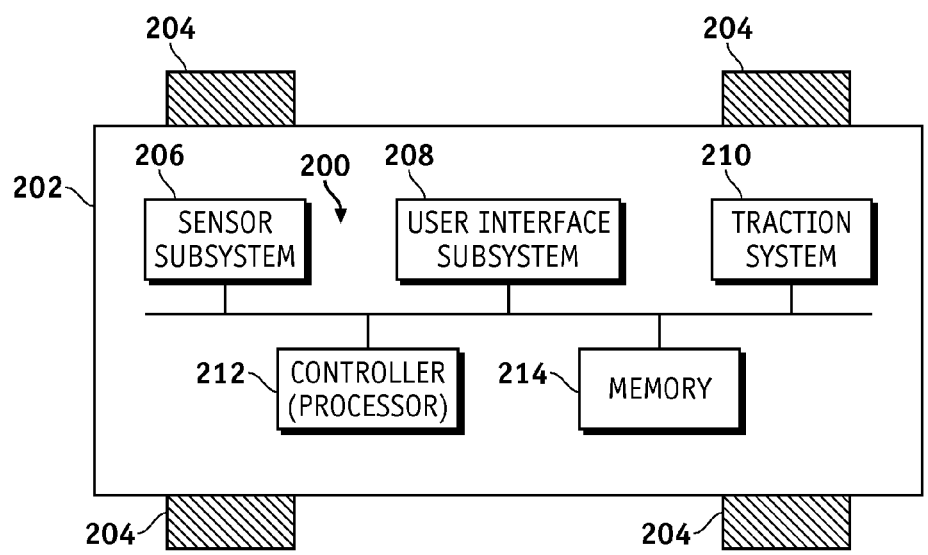
FIG. 2 is a schematic representation of an exemplary embodiment of an active traction control system onboard a vehicle.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

The subject matter described here relates to an active traction control system that is intended for high performance vehicles (e.g., race cars) or for any vehicle that might be driven in a high performance mode. In contrast to conventional designs that conservatively reduce engine torque as soon as a low threshold amount of wheel slip is detected, the active traction control systems described here allows the vehicle to maximize acceleration while exiting corners and to otherwise take full advantage of the traction capacity of the tires.

The exemplary embodiment of the active traction control system described below is an engine-only control system that is optimized for vehicle performance in environments such as on a race track or autocross course. The system employs a corner exiting control methodology that estimates in real-time (or virtually real-time) the amount of tire traction that is utilized by the vehicle during cornering. This estimate is then compared to an estimated total available tire capability. The amount of potential tire force that is not being used for cornering is then considered to be available for purposes of accelerating the vehicle through the corner. The system uses this remaining tire force/traction value to calculate an engine torque limit that will result in the potential tire force. The calculated torque limit is then utilized as an active control limit on the actual driver-initiated engine torque command. The active traction control system described herein also implements a feedback or backup control component. In this regard, if actual wheel slip in excess of a designated threshold amount is detected, the system can consider the amount of wheel slip and further adjust the engine torque command as needed.

Conventional active traction control systems are designed to achieve vehicle stability at the expense of performance. In contrast, the system described here can be utilized to optimize performance (in particular, corner exiting) while still improving overall vehicle stability. Accordingly, the corner exiting control methodology can assist the driver in maintaining lateral control of the vehicle during hard cornering maneuvers and during other high performance maneuvers. The system strives to optimize the longitudinal acceleration of the vehicle after considering real-time driving conditions. This type of active traction control allows the driver to achieve quicker and more consistent lap times in a racing environment.

Figure 1:
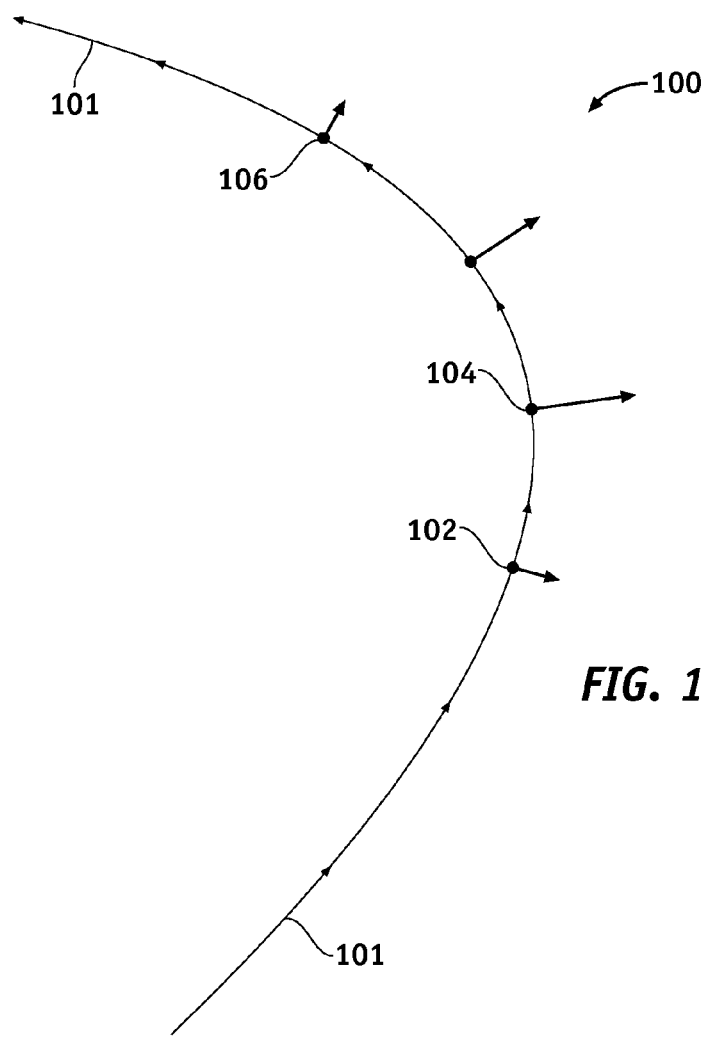
FIG. 1 is a diagram that illustrates lateral forces associated with a vehicle exiting a corner.

Although the active traction control system and methodologies described herein can be effectively used in any number of different driving scenarios and conditions, certain benefits can be derived during corner exiting. In this regard, FIG. 1 is a diagram that illustrates lateral forces associated with a vehicle exiting a corner 100. FIG. 1 shows the desired path 101 of the vehicle through corner 100. Before entering corner 100, the tires of the vehicle will experience little or no lateral force due to road friction. At or near an entry point 102, however, relatively low lateral forces appear (indicated by the short arrow). Consequently, the tire traction at point 102 must be sufficient to overcome the relatively low lateral forces, otherwise wheel slip will occur.

FIG. 1 illustrates the lateral forces associated with a typical cornering maneuver in a performance environment. The lateral force is the highest at or near the apex point 104 of corner 100 (indicated by the long arrow), and such relatively high lateral forces might be maintained as the vehicle accelerates and exits corner 100. At or near the exit point 106, the lateral force reduces because the vehicle is no longer cornering and is beginning to travel in a straight path. Under race conditions, the goal is to accelerate through a corner at a point at or near the tire traction limit of the vehicle. If the vehicle is cornering below the tire traction limit, then the driver has not taken advantage of the full capabilities of the vehicle. On the other hand, if the vehicle is cornering above the tire traction limit, then the vehicle may experience excessive and undesirable wheel slip. As mentioned previously, the active traction control system described herein allows the driver to take full advantage of the tire traction potential while reducing or eliminating unwanted wheel slip.

FIG. 2 is a schematic representation of an exemplary embodiment of an active traction control system 200 onboard a vehicle 202. Vehicle 202 includes four wheels, each having a respective tire 204 mounted thereto. Although vehicle 202 may be a rear-wheel drive vehicle, a front-wheel drive vehicle, an all-wheel drive vehicle, or a vehicle having a selective drive configuration, the following description refers to a rear-wheel drive vehicle.

Active traction control system 200 (which is also referred to herein as an active corner exiting control system) is an onboard vehicle-based system in that its components are located on, carried by, or integrated into the host vehicle 202. System 200 may include or cooperate with at least the following components or elements, without limitation: a vehicle sensor subsystem 206; a user interface subsystem 208; a traction system 210; a controller 212; and an appropriate amount of memory 214. These and other elements of system 200 are coupled together in an appropriate manner to accommodate the communication of data, control commands, and signals as needed to support the operation of system 200. For the sake of brevity, conventional techniques related to vehicle control systems, vehicle sensor systems, torque management, and other functional aspects of the systems (and the individual operating components of the systems) may not be described in detail herein.

Sensor subsystem 206 is suitably configured to collect real-time (and possibly non-real-time) vehicle status data during operation of vehicle 202. System 200 can process some or all of this vehicle status data in the manner described below, and other subsystems or components of vehicle 202 might also process or utilize some or all of this vehicle status data. In certain embodiments, sensor subsystem 206 includes sensors (not shown) that collect data indicative of the yaw rate of the vehicle, the lateral acceleration of the vehicle, the velocity of the vehicle, the rotational velocity of the wheels of the vehicle, the wheel slip associated with the wheels of the vehicle, the vertical and longitudinal acceleration, the vehicle pitch, the vehicle roll rate, the wheel position relative to the body of the vehicle, or the like. The design, configuration, and operational details of such vehicle-based sensors will not be described herein because these sensors and their applications are well known to those familiar with the automotive industry.

User interface subsystem 208 is suitably configured as a human-machine interface for vehicle 202 and, in particular, for system 200. User interface subsystem 208 can be realized using one or more elements, features, devices, or components, which may be conventional in nature. For example, user interface subsystem 208 may include, without limitation, any number of: buttons; knobs; switches; levers; dials; keypads; touch screens; touch pads; or the like. To support system 200, user interface subsystem 208 preferably includes one or more features or elements configured to receive a user-selected driving condition setting that is indicative of current road conditions, the current road coefficient of friction, a current tire-to-road traction value, or the like. In certain embodiments, user interface subsystem 208 also includes one or more features or elements configured to receive a user-selected vehicle handling setting, which might be indicative of a desired suspension feel, a desired handling limit, or the like.

Figure 3:
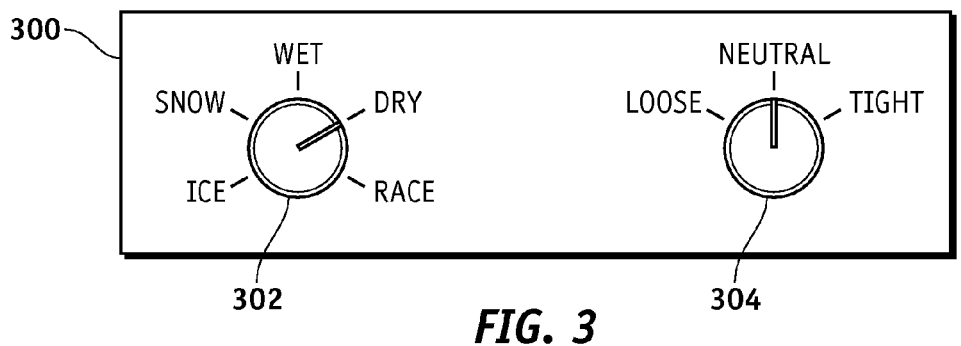
FIG. 3 is a front panel view of an exemplary embodiment of a user interface subsystem suitable for use with an active traction control system.

FIG. 3 is a front panel view of an exemplary embodiment of a user interface subsystem 300 suitable for use with system 200. Indeed, user interface subsystem 208 (FIG. 2) might incorporate the elements shown in FIG. 3. This particular embodiment of user interface subsystem 300 includes two mechanical knobs that are designed to be manually actuated by the driver. A first knob 302 is manipulated to designate the user-selected driving condition setting. Although any number of different settings can be supported by system 200, this embodiment includes at least the following settings: an icy road setting; a snowy road setting; a wet road setting; a dry road setting; and a race track setting. Notably, these settings generally represent a range of driving conditions corresponding to different tire traction potentials. For example, under icy conditions system 200 can assume that the total available potential tire traction is relatively low. In contrast, under race track conditions (e.g., desirable road conditions and race tires) system 200 can assume that the total available potential tire traction is relatively high. In alternate embodiments, user interface subsystem 300 need not be limited to a specific number of discrete driving condition settings. In such embodiments, user interface subsystem 300 could be suitably configured to select any number of different driving condition settings defined between any two boundary settings. The significance of the user-selected driving condition setting will be explained in greater detail below.

A second knob 304 of user interface subsystem 300 is manipulated to designate the user-selected vehicle handling setting. Although any number of different settings can be supported by system 200, this embodiment includes at least the following settings: a loose setting; a neutral, intermediate, average, or middle setting; and a tight setting. Notably, these settings generally represent a range of vehicle handling preferences corresponding to different suspension and/or handling traits, characteristics, or "feel" of the vehicle. For example, the loose setting can be selected if the driver prefers to experience a manageable but safe amount of wheel slip and "looser" active control of the vehicle. In contrast, the tight setting can be selected if the driver prefers to experience little or no wheel slip and "tighter" active control of the vehicle. In alternate embodiments, user interface subsystem 300 need not be limited to a specific number of discrete vehicle handling settings. In such embodiments, user interface subsystem 300 could be suitably configured to select any number of different vehicle handling settings defined between any two boundary settings. The significance of the user-selected vehicle handling setting will be explained in greater detail below.

Referring again to FIG. 2, vehicle 202 obtains traction power from traction system 210. Traction system 210 may include an internal combustion engine, an electric motor, or a combination thereof. Traction system 210 is suitably configured to generate torque for the drive wheels of vehicle 202. In practice, traction system 210 responds to driver-initiated commands (e.g., throttle) to increase or decrease the torque delivered to the drive wheels in a real-time manner. Moreover, system 200 can provide automatic and active real-time control of traction system 210 under certain operating conditions, as described in more detail herein.

Controller 212 can be operatively coupled to vehicle sensor subsystem 206, user interface subsystem 208, and traction system 210 in an appropriate manner. Controller 212 may be implemented using one or more processors, which may be co-located or distributed throughout vehicle 202. In this regard, controller 212 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Controller 212 may be realized as a microprocessor, a controller, a microcontroller, or a state machine. Moreover, controller 212 may be implemented as a combination of computing devices, e.g., a combination of a digital signal processor and a microprocessor, a plurality of microprocessors, one or more microprocessors in conjunction with a digital signal processor core, or any other such configuration.

Memory 214 may be volatile (such as RAM), non-volatile (such as flash memory, etc.) or a combination thereof. In this regard, memory 214 can be coupled to controller 212 such that controller 212 can read information from, and write information to, memory 214. In the alternative, memory 214 may be integral to controller 212. As an example, controller 212 and memory 214 may reside in an ASIC. Memory 214 supports the active traction control techniques described herein by storing and recording collected vehicle status data, user-selected settings, and possibly other information that might be used or needed by system 200.

Figure 4:
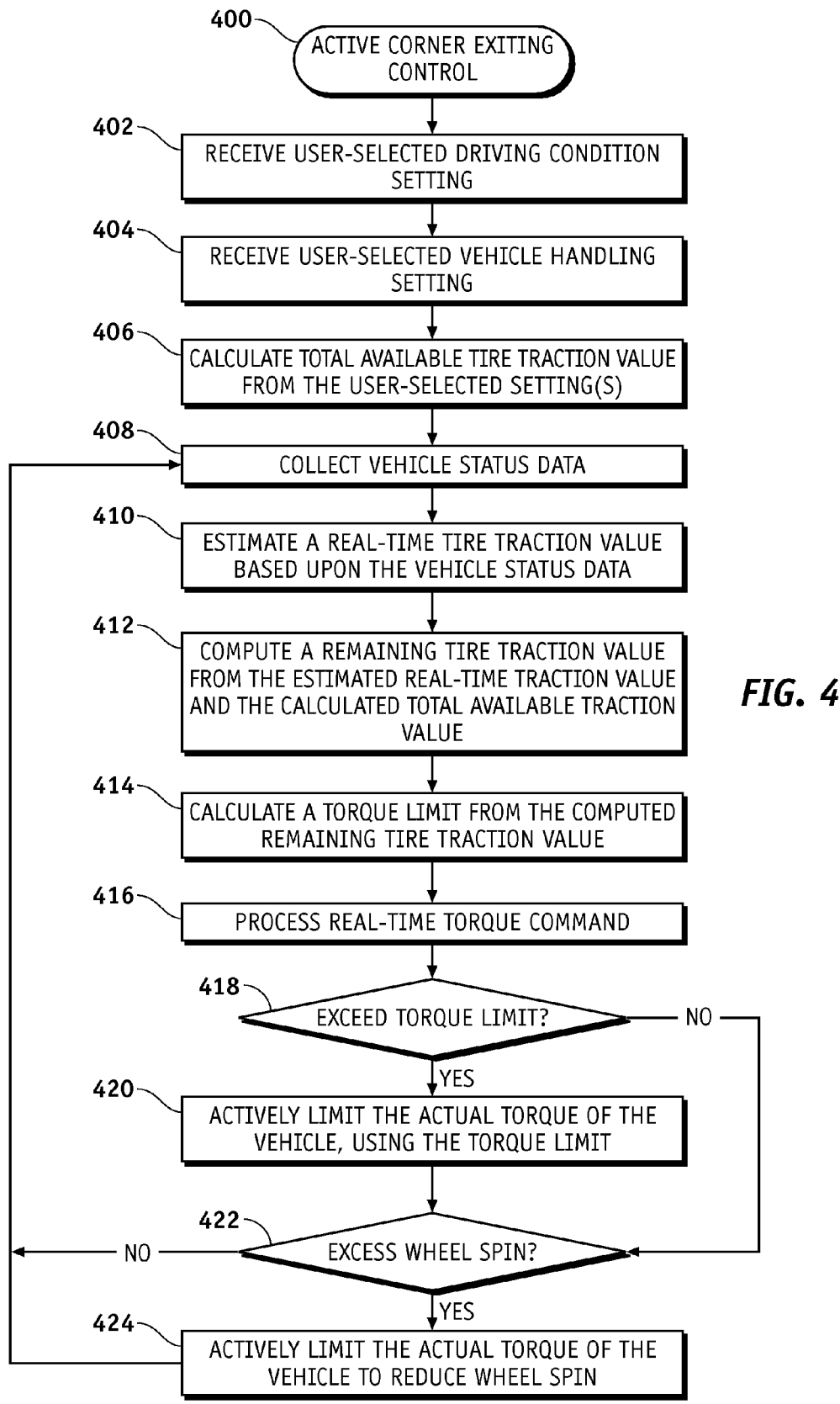
FIG. 4 is a flow diagram that illustrates an exemplary embodiment of an active corner exiting control process.

FIG. 4 is a flow diagram that illustrates an exemplary embodiment of an active corner exiting control process 400. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., an onboard sensor, a controller, or a user interface component. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

The active traction control routine associated with process 400 may represent a default routine that is performed whenever the vehicle is operating, or it may represent an optional or selectable routine that is performed only when the driver (or other person) activates a "performance" or "race" mode. For the latter scenario, the performance or race mode can be activated in response to user manipulation of a switch or button, e.g., an element of user interface subsystem 208 (FIG. 2).

This embodiment of process 400 receives a user-selected driving condition setting (task 402) that is indicative of road coefficient of friction, road conditions, the current weather conditions, the type of tires mounted to the vehicle, etc. As mentioned above with reference to FIG. 3, the selected driving condition setting may be an icy road setting, a snowy road setting, a wet road setting, a dry road setting, a race track setting, or the like. Additionally (or alternatively), process 400 may receive a user-selected vehicle handling setting (task 404). As mentioned above with reference to FIG. 3, the selected vehicle handling setting may be a loose setting, an neutral setting, a tight setting, or the like. Depending upon the system deployment, process 400 could receive more (or less) user-selected settings that influence, govern, or otherwise affect the active traction control routine.

Process 400 may continue by calculating or generating a total available tire traction value from the user-selected setting or settings (task 406). For example, the total available tire traction value could be generated in response to the user-selected driving condition setting, in response to the user-selected vehicle handling setting, or in response to both. As used herein, the total available tire traction value represents an estimate of the total available tire capability, friction, or lateral force capacity. In preferred embodiments, the total available tire traction value is a force expressed in Newtons. The user-selected driving condition setting influences the total available tire traction value—relatively slick driving conditions (e.g., icy) will result in a lower total available tire traction value, while relatively grippy driving conditions (e.g., race) will result in a higher total available tire traction value. Similarly, the user-selected vehicle handling setting also influences the total available tire traction value—the loose setting will result in a higher total available tire traction value (which allows the vehicle to experience more wheel slip before torque limiting takes place), while the tight setting will result in a lower total available tire traction value (which allows the vehicle to experience less wheel slip before torque limiting takes place). In practice, task 406 can calculate the total available tire traction value as a suitable and appropriate function of the user-selected setting(s). For example, in certain embodiments the user-selected settings are used to modify a preselected or predetermined nominal value of a tire friction coefficient. This nominal value can then be multiplied or otherwise adjusted using a tire normal force estimate to obtain the total estimated tire force. Other approaches or algorithms can be employed to improve the system performance, and the above represents merely one suitable example.

Notably, tasks 402, 404, and 406 could be performed as soon as the user selects the settings, regardless of whether the vehicle is idling, cornering, or operating. Indeed, tasks 402, 404, and 406 could be performed during a time when the engine is not running. Eventually, however, the vehicle will be driven on a road, a race track, or a course, and process 400 can be performed to actively assist in corner exiting control. In this regard, process 400 collects vehicle status data (task 408) from one or more onboard vehicle sensors. Task 408 preferably collects the vehicle status data in real-time or virtually real-time so that process 400 can immediately react to the current operating status of the vehicle. In preferred embodiments, task 408 collects vehicle status data such as yaw rate, lateral acceleration, velocity, wheel speed, and the like. In practice, the vehicle status data can be refreshed and sampled quickly and often, e.g., once every five to twenty milliseconds.

In a real world environment, a tire can generate a given amount of total force parallel to the road surface plane for a given normal force. A simple way of describing the available force is to use a friction circle or ellipse. In this regard, FIGS. 5-9 are diagrams that represent tire friction capabilities for a vehicle operating under various driving conditions. In these diagrams, the vertical axis indicates longitudinal tire forces (Fx) and the horizontal axis indicates lateral tire forces (Fy). The total tire force at any given time is the vector sum of the individual Fx and Fy components. Moreover, the normal or longitudinal force will generally be different for each driven tire, especially during cornering. The maximum available tire force can be thought of as a circle of diameter Fmax. In practice, tire characteristics are more complex, performance tires usually generate more force laterally than longitudinally, and, therefore, friction ellipses (rather than circles) are often used to characterize tire forces. Indeed, the methodology described herein is based upon a friction ellipse model. Accordingly, FIGS. 5-9 depict ellipses rather than circles.

Figure 5:
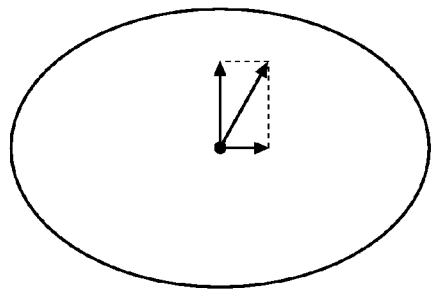
FIGS. 5-9 are diagrams that represent tire friction capabilities for a vehicle operating under various driving conditions.
Figure 6:
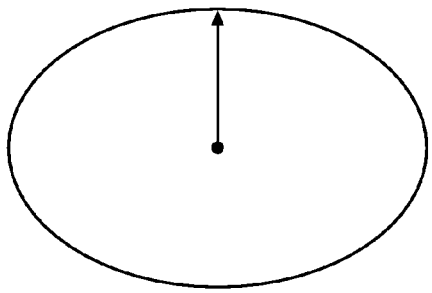
Figure 7:
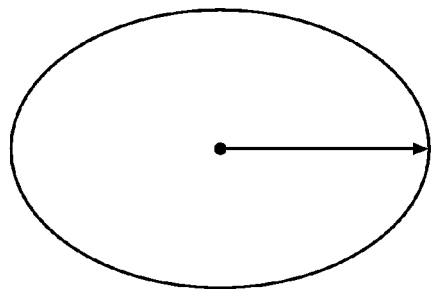

FIG. 5 depicts exemplary forces that might arise during normal driving. Here, the longitudinal force, the lateral force, and the vector sum are all well within the Fmax boundary. FIG. 6 depicts a scenario where the vehicle is operating at maximum longitudinal acceleration. In FIG. 6, the longitudinal force reaches the Fmax boundary, and the lateral force is negligible. FIG. 7 depicts a scenario where the vehicle is operating at maximum cornering capability. Here, the lateral force reaches the Fmax boundary, and the longitudinal force is negligible.

Figure 8:
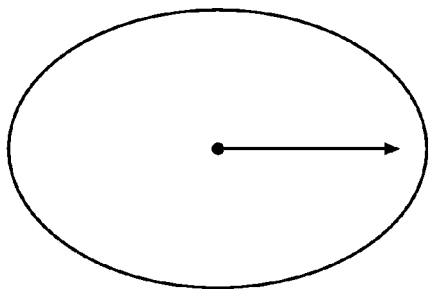
Figure 9:
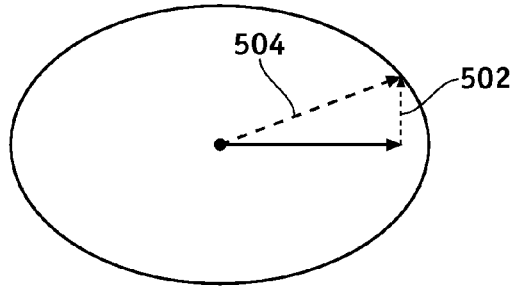

FIG. 8 depicts the tire forces experienced when a vehicle is cornering hard but below its maximum cornering capacity. As shown in FIG. 8, the vector for Fy is still within the Fmax boundary. Thus, the full friction potential of the tire is not being utilized. Consequently, the amount of tire force available to accelerate the vehicle is depicted by the vector 502 in FIG. 9, which represents a remaining longitudinal force capability. The vector sum of the actual lateral force and vector 502 results in an overall force vector 504 that terminates at the Fmax boundary, thus maximizing the potential of the tire. The methodology described herein tries to determine the force associated with vector 502, and limits the engine torque to the value that would provide that force. If more engine torque is supplied (i.e., torque that would exceed the tire capability), then wheel slip will occur. When torque control is active, if the driver inputs exceed the tire force capability, then the tire will saturate and the magnitude of the force vector will be Fmax and the direction will be dictated by the vehicle momentum.

Referring again to FIG. 4, the sampled vehicle status data can then be processed in an appropriate manner to estimate a real-time tire traction value (task 410). Task 410 is performed in real-time (or virtually real-time) during operation of the vehicle to estimate the actual amount of tire traction potential that is being utilized during the current driving maneuver. For this embodiment, the real-time tire traction value represents an estimate of lateral force in Newtons. For example, if the vehicle is traveling at a low velocity in a straight line, then the real-time tire traction value will be relatively high, which indicates a "surplus" of lateral tire traction available for cornering. In contrast, if the vehicle is traveling through a corner with high acceleration, then the real-time tire traction value will be relatively low, which indicates little remaining lateral tire traction available.

Process 400 can then calculate, generate, compute, or derive a remaining tire traction value (task 412) from the estimated real-time tire traction value and from the total available tire traction value. This remaining tire traction value is based on a comparison of the estimated real-time tire traction value to the total available tire traction value. More specifically, task 412 computes the remaining tire traction value by subtracting the estimated real-time tire traction value from the total available tire traction value. In this regard, the remaining tire traction value (which is expressed in units of Newtons in this example) may be the actual calculated difference or it may be a value that is derived from or influenced by the actual calculated difference. Notably, the remaining tire traction value represents the "surplus" tire traction capacity or capability for the current real-time operating conditions. In other words, a positive remaining tire traction value indicates that the vehicle can be driven harder through the corner (higher acceleration through the corner) without experiencing detrimental wheel slip or loss of control. For this particular embodiment, a higher remaining tire traction value indicates that the vehicle is being driven below its full cornering potential, while a lower remaining tire traction value indicates that the vehicle is being driven closer to its full cornering potential.

Next, process 400 calculates a traction system torque limit from the remaining tire traction value (task 414). In alternate embodiments, the torque limit could be calculated concurrently with the computation of the remaining tire traction value. Task 414 may be associated with a suitable conversion formula or algorithm that converts the remaining tire traction value into the torque limit. The torque limit is associated with a maximum allowable torque command for the traction system of the vehicle. For this example, the torque limit is expressed in units of Newton-meters. In practical deployments, the torque limit will be expressed in a format that can be recognized and processed by the active traction control elements of the vehicle (e.g., throttle control, ignition timing control, cylinder cutout control, etc.). Notably, this torque limit will be influenced by the user-selected driving condition setting, the user-selected vehicle handling setting, and/or the real-time vehicle status data (as applicable). As explained below, this real-time torque limit is used to limit the actual traction system torque of the vehicle if necessary.

During operation of the vehicle, the system will process real-time torque commands (task 416) that are generated in response to driver input (e.g., throttle pedal actuation). These torque commands influence the power output of the traction system, which in turn influences the torque applied to the drive wheels of the vehicle, which in turn influences lateral forces experienced by the tires during cornering. If the real-time torque command exceeds the computed torque limit (query task 418), then process 400 actively limits the actual traction system torque of the vehicle (task 420). It should be appreciated that query task 418 may perform an absolute comparison or it may determine whether the real-time torque command exceeds the computed torque limit by at least a defined threshold amount. In preferred embodiments, task 420 actively limits the actual torque output of the traction system using the calculated torque limit as a maximum limit. As explained above, task 420 may leverage one or more conventional techniques to implement the active torque control, including, without limitation: active throttle control; ignition timing control; cylinder cutout control; electric current limiting or regulation (for electric motors); clutch slip control; viscous coupling control; or the like. Although a practical implementation may actively regulate braking, preferred embodiments designed for performance driving and racing conditions only regulate aspects of the traction system because braking during corner exiting does not improve performance or lap times.

The use of the real-time torque limit as described above represents a "feed-forward" active traction control methodology in that the torque limit is dynamically calculated based on current vehicle operating conditions. In certain embodiments, process 400 also implements a "feedback" active traction control methodology. In this regard, process 400 could monitor wheel slip of the vehicle (using conventional techniques and technologies) to detect whether or not excess wheel spin is present. If process 400 detects an amount of wheel spin that exceeds a threshold wheel spin value (query task 422), then process 400 can perform a task 424. In certain embodiments, the threshold wheel spin value could be a user-selectable setting, as mentioned above for the selectable driving condition setting and the selectable vehicle handling setting. During task 424, the active traction control system can actively limit the actual traction system torque of the vehicle (in the manner described above) in an attempt to reduce and control the wheel spin. As depicted in FIG. 4, process 400 also leads to query task 422 if query task 418 determines that the real-time torque command does not exceed the calculated torque limit. Accordingly, query task 422 and task 424 serve as a backup measure to ensure that the vehicle does not experience excessive wheel spin that might result in loss of full control and/or a reduction in vehicle performance and handling. Therefore, if the driver commands correspond to optimized tire performance, then the result will be maximum acceleration and a neutral vehicle feel. If the driver underestimates the tire capability, then the acceleration will be less than the maximum and the vehicle will have a tight feeling. On the other hand, if the driver overestimates the tire capability, then the system will provide enough torque to saturate the tire, which will generate excess wheel slip and result in a loose feel for the vehicle.

Referring again to query task 422, if excess wheel spin is not detected, then process 400 exits or returns to task 408 to continue its real-time processing. In this manner, process 400 continuously collects updated vehicle status data, dynamically calculates torque limits, and actively limits the torque output of the traction system as needed. The driver remains in full control whenever: (1) the driver-requested torque command does not exceed the calculated torque limit, and (2) excess wheel spin is not detected. If, on the other hand, the driver-requested torque command exceeds the calculated torque limit or excess wheel spin is detected, then active traction control executes to reduce the actual torque output as needed.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for active traction control of a vehicle, the method comprising:
   estimating a real-time tire traction value during operation of the vehicle;
   computing a remaining tire traction value based upon a comparison of the estimated real-time tire traction value to a total available tire traction value;
   calculating a traction system torque limit from the remaining tire traction value; and
   limiting actual traction system torque of the vehicle using the traction system torque limit.

2. The method of claim 1, wherein the estimating step estimates the real-time tire traction value based upon vehicle status data obtained from sensors onboard the vehicle.

3. The method of claim 2, wherein the vehicle status data comprises data indicative of yaw rate, lateral acceleration, velocity, rotational velocity of the wheels, wheel slip, vertical acceleration, longitudinal acceleration, pitch, roll, or wheel position of the vehicle.

4. The method of claim 1, wherein the computing step computes the remaining tire traction value by subtracting the estimated real-time tire traction value from the total available tire traction value.

5. The method of claim 1, further comprising:
receiving a user-selected driving condition setting; and
generating the total available tire traction value in response to the user-selected driving condition setting.

6. The method of claim 5, wherein the user-selected driving condition setting is indicative of road coefficient of friction.

7. The method of claim 1, further comprising:
receiving a user-selected vehicle handling setting; and
generating the total available tire traction value in response to the user-selected vehicle handling setting.

8. The method of claim 1, further comprising:
detecting an amount of wheel spin that exceeds a threshold wheel spin value; and
in response to the detecting step, reducing the actual traction system torque of the vehicle.

9. A method for active control of corner exiting of a vehicle, the method comprising:
receiving a user-selected driving condition setting that is indicative of road conditions;
estimating a real-time tire traction value during operation of the vehicle;
generating a total available tire traction value in response to the user-selected driving condition setting;
computing a remaining tire traction value based upon a comparison of the estimated real-time tire traction value to the total available tire traction value;
calculating a traction system torque limit that is influenced by the user-selected driving condition setting, wherein the calculating step calculates the traction system torque limit from the remaining tire traction value; and
limiting actual traction system torque of the vehicle using the traction system torque limit.

10. The method of claim 9, wherein the estimating step estimates the real-time tire traction value based upon vehicle status data obtained from sensors onboard the vehicle.

11. The method of claim 9, wherein the computing step computes the remaining tire traction value by subtracting the estimated real-time tire traction value from the total available tire traction value.

12. The method of claim 9, wherein the receiving step receives a user-selected driving condition setting that is selected from the group consisting of: a wet road setting; a dry road setting; a race track setting; a snowy road setting; and an icy road setting.

13. The method of claim 9, further comprising the step of receiving a user-selected vehicle handling setting, wherein the calculating step calculates the traction system torque limit based upon the user-selected driving condition setting and the user-selected vehicle handling setting.

14. The method of claim 13, wherein the user-selected vehicle handling setting is selected from the group consisting of: a loose setting; a neutral setting; and a tight setting.

15. The method of claim 9, further comprising:
detecting an amount of wheel spin that exceeds a threshold wheel spin value; and
in response to the detecting step, reducing the actual traction system torque of the vehicle.

16. An onboard vehicle-based system for active traction control of a vehicle having drive wheels, the system comprising:
a user interface subsystem configured to receive a user-selected driving condition setting that is indicative of current road conditions;
a vehicle sensor subsystem configured to collect real-time vehicle status data during operation of the vehicle;
a traction system configured to generate torque for the drive wheels of the vehicle; and
a controller coupled to the user interface subsystem, to the vehicle sensor subsystem, and to the traction system, the controller being configured to:
receive the real-time vehicle status data from the vehicle sensor subsystem and, in response thereto, to estimate a real-time tire traction value for the vehicle;
receive the user-selected driving condition setting from the user interface subsystem and, in response thereto, to generate a total available tire traction value;
compute a remaining tire traction value based upon a difference between the total available tire traction value and the estimated real-time tire traction value;
calculate a traction system torque limit from the remaining tire traction value; and
limit torque output of the traction system using the fraction system torque limit.

17. The system of claim 16, wherein the vehicle sensor subsystem comprises sensors that collect data indicative of yaw rate, lateral acceleration, velocity, rotational velocity of the wheels, wheel slip, vertical acceleration, longitudinal acceleration, pitch, roll, or wheel position of the vehicle.

18. The system of claim 16, wherein the user interface subsystem is configured to receive a user-selected vehicle handling setting, and wherein the controller is configured to generate the total available tire fraction value in response to the user-selected driving condition setting and the user-selected vehicle handling setting.

19. The system of claim 18, wherein the user-selected vehicle handling setting comprises a loose setting, a neutral setting, and a tight setting.

* * * * *